(12) United States Patent
Walter et al.

(10) Patent No.: US 7,121,293 B2
(45) Date of Patent: Oct. 17, 2006

(54) TRI VALVE BACKFLOW PREVENTER

(76) Inventors: Guy Robert Walter, 6419 3rd Ave. NE., Bradenton, FL (US) 34208; Gail Patricia Walter, 6419 3rd Ave. NE., Bradenton, FL (US) 34208

(*) Notice: Subject to any disclaimer, the term of this patent is extended or adjusted under 35 U.S.C. 154(b) by 268 days.

(21) Appl. No.: 10/805,646

(22) Filed: Mar. 22, 2004

(65) Prior Publication Data

US 2005/0205139 A1   Sep. 22, 2005

(51) Int. Cl.
*E03B 7/07* (2006.01)
*E03B 1/02* (2006.01)

(52) U.S. Cl. .............. 137/15.01; 137/599.11; 137/601.2

(58) Field of Classification Search ........ 137/599.09, 137/599.11, 599.13, 599.14, 599.15, 601.2, 137/15.01
See application file for complete search history.

(56) References Cited

U.S. PATENT DOCUMENTS 3,438,397 A * 4/1969 Gilpin ............... 137/599.09
6,357,477 B1 * 3/2002 Walcott et al. ...... 137/599.15

* cited by examiner

*Primary Examiner*—Stephen M. Hepperle
(74) *Attorney, Agent, or Firm*—Dorothy S. Morse

(57) ABSTRACT

A tri valve backflow preventer having parts and materials preferably consisting of steel nuts and bolts, ductile iron operating nuts, nitrile rubber O-rings, nitrile rubber gaskets, manganese bronze valve adjusting stems, valve wedge gates made of ductile iron encapsulated with EPDM rubber, and ductile iron valve bodies. Material and parts are constructed in accordance with ASTM standards and the requirements of the AWWAC-509 and AWWAC-504 for gate valves and butterfly valves. The tri valve backflow preventer is used with a temporary conventional backflow assembly between existing water main pipe and new/upgraded sections of water main pipe while they are under construction. It is left in place when the temporary backflow assembly is removed. Its use saves extra inspection hours, extra man hours, extra equipment hours, conserves large amounts of good water otherwise needed for flushing, and reduces the safety risk to the public during activation of new water lines.

20 Claims, 6 Drawing Sheets

TRI VALVE BACKFLOW PREVENTER

BACKGROUND

1. Field of the Invention

This invention relates to the field of devices used to protect public drinking water during and after water main construction, specifically to a tri valve backflow prevention apparatus and a method of its use with a temporarily installed conventional backflow prevention assembly between existing water main pipe and a newly constructed, repaired, or upgraded section of water main pipe, to provide water needed at the construction site for pipe testing and other purposes. Its advantages relate to the temporary backflow prevention assembly being exclusively connected to it, and not to the water main pipe under construction, whereby when pressure and bacterial testing in the constructed pipe is successfully completed and the temporary assembly is removed after construction for use elsewhere, water is not drained from the constructed pipe, as in prior art methods of water main construction in common use today. Water draining into the construction hole not only compromises worker safety, it subjects the opened pipe to a risk of bacterial contamination, causes additional good drinking water to be used for flushing the constructed pipe to remove possible bacterial contamination and then to refill the constructed pipe prior to its use for delivery of drinking water to the public, and also causes a need for further pressure and bacterial testing. Thus, with present invention use, inspection and testing time of new/added sections of water main pipe are significantly reduced which translates into a reduced job cost, labor and material cost are also reduced as no sleeve installation is required between existing and new sections of water main pipe to replace the removed temporary backflow prevention assembly, and the time required to activate the constructed pipe for delivery of drinking water to the public is significantly reduced as one simply shuts off the two side valves of the present invention and removes the temporary backflow prevention assembly, leaving the new/repaired/upgraded pipe filled with good drinking water and ready for immediate water delivery as soon as one chooses to open the main valve body of the present invention using its easily accessible keyed valve stem. Since no breach ever occurs in or between the existing and constructed water main pipe after the present invention is installed and successful pressure and bacterial testing are initially accomplished, the new/repaired/upgraded water main pipe can immediately be used, whereas with currently known prior art methods, much additional labor and material expense is required to activate the constructed pipe, and a large amount of good drinking water is unnecessarily wasted for additional flushing and refilling of the constructed pipe after temporary backflow prevention assembly removal. Further, with present invention use, the two new sleeve joints created after temporary assembly removal in prior art construction are avoided, which otherwise increase the after construction failure risk of the water main pipe. Use of the present invention also eliminates the increased health risk posed to public drinking water as a result of opening the new/repaired/upgraded water main pipe midway during construction and after the constructed pipe has initially satisfied needed pressure and bacteria testing requirements. The present invention tri valve apparatus has a unitary structure that incorporates two side valve bodies and a main valve body together within a single housing. Only the two side valve bodies remain open during construction and provide the points of connection for both ends of a temporary backflow prevention assembly. The two side valves of the present invention are only shut and plugged after successful pressure and bacteria testing of the constructed pipe is achieved, with the main valve body of the present invention being thereafter opened via its easily accessible keyed valve stem to let good drinking water into the new/repaired/upgraded water main pipe for delivery to the public. Thus, the main valve of the present invention is directly connected between the existing and new/repaired/upgraded water main pipe at the outset of construction, and it remains in place even after the pipe construction is complete and the temporary assembly is removed from the side valve bodies, becoming a permanent part of the water main structure during its useful life and until it needs refurbishment or replacement.

2. Description of the Related Art

To protect public drinking water during the construction of new sections of water main pipe, and the upgrading of existing sections of water main pipe, a jumper system is commonly used. However, use of a jumper system has many disadvantages, including potentially adverse affects on worker safety and/or the safety of the drinking water to be delivered to the public via the new or repaired/upgraded sections of water main pipe. A jumper system involves the installation of one end of a temporary backflow prevention system using angled pipe fittings onto an existing water main valve and installation of the opposing end of the same temporary backflow prevention system to a section of new or repaired/upgraded water main pipe, also using angled pipe fittings. However, such an installation of a temporary backflow prevention system typically creates an approximate eight foot separation between the new/upgraded and existing sections of water main pipe that will ultimately need to be connected together after the temporary backflow prevention system is removed. However, before removal of the temporary backflow prevention system, installation of the new or upgraded section of water main pipe must be completed and it must successfully pass all pressure and bacterial testing requirements. The problems begin to occur when the temporary backflow prevention system is removed, as all of the water in the new or upgraded sections of water main pipe used for its testing is lost, and then the new or upgraded water main pipe needs to be refilled, re-flushed, and successfully pass additional pressure and bacterial contamination testing prior to being used for drinking water delivery. One important problem associated with the removal of the conventional temporary backflow prevention system just described is that the contractors performing the new main construction typically excavate back down to the whole area of the existing water main valve and the new or repaired/upgraded water main pipe, and then when the jumper system is removed, all of the water in the new or repaired/upgraded water main pipe that was used for its testing drains into the working hole. This causes the waste of hundreds of gallons of good clean drinking water, and further leaves the existing valve and new or upgraded water main pipe open and exposed to the possible entry of bacteria, a procedure that defeats the pre-testing step of chlorinating the inside of the new or repaired/upgraded sections of water main pipe to make them bacteria-free. Worker safety can also be compromised by the water drained into the excavation hole. Further disadvantages of the commonly used jumper system involve the tie in of the new or upgraded water main pipe, which is completed by use of a retrained ductile iron sleeve to connect the new or repaired/upgraded water main pipe to the existing water main shut-off valve, followed by flushing of the new/upgraded/repaired water main pipe with water to remove all of the air therein. The tie in takes extra inspection hours, extra man hours, extra equipment hours, extra material cost, wasted large amounts of good water, and even then there is no guarantee that the new water line is free of bacteria.

In contrast, the tri valve of the present invention is not removed and eliminates all of the above-mentioned problems. The main valve of the tri valve present invention is only opened after its two side valves used during construction are closed and plugged. Also, during use of the present invention tri valve, the existing water main pipe is sealed off at all times from bacteria intrusion. Further, the added cost of providing the present invention tri valve is minimal when compared to the total cost of prior art water main installations and/or upgrade that include extra man hours and equipment time needed for additional pipe flushing and inspection, the amount of good potable water wasted during jumper removal and the additional pipe flushing needed to remove air and possible bacterial contamination, and the safety risk posed to the drinking water provided for the public. No other apparatus or method is known that functions in the same manner or provides all of the advantages of the present invention.

BRIEF SUMMARY OF THE INVENTION

It is the primary object of this invention to provide additional valve means for use with a conventional temporary backflow prevention system for improved water main installation and upgrade as a result of reduced man hours and equipment time, reduced use of good water for flushing and testing purposes, and reduced safety risk for the drinking water provided to the public after installation. A further object of this invention is to provide additional valve means for improved water main installation and upgrade that can be used everywhere for new and repaired/upgraded water mains. It is also an object of this invention to provide additional valve means for improved water main installation and upgrade that is safe and practical, and results in the use of two less joints in the finished water main pipe. A further object of this invention is to provide additional valve means for improved water main installation and repair/upgrade that allows for the new water main pipe to be completely pressure tested and bacteria free after temporary backflow prevention system removal, and require no subsequent tie in procedure. It is also an object of this invention to provide additional valve means for improved water main installation and upgrade that allows for fire protection on the construction site at all times where a fire hydrant connection is installed. It is a further object of this invention is to provide additional valve means for improved water main installation and repair/upgrade that meets regulatory drinking water regulations and standards.

The present invention tri valve, when properly made and used, will be installed onto an existing section of potable water main pipe by means of a tapping sleeve, a cut-in tee, an existing stub out, an existing valve, and/or other similar means, at the beginning of the excavation process to install a new water main, or upgrade/repair an existing section of water main pipe, for future use by residential or commercial developments to satisfy potable water needs. For example, a contractor or utility company would excavate down to an existing 12-inch water main with an existing 12-inch stub out tee, or install a 12-inch tapping saddle to core into an existing 12-inch potable water line. Thereafter, a 12-inch by 6-inch present invention tri valve would be installed by whatever means are available to tie it in, in accordance with federal, state, and/or local standards or specifications. When tie in is complete, the 12-inch main valve gate of the tri valve present invention would be shut off. A backflow prevention assembly with two check valves would be connected to the two 6-inch valves on the same side of the tri valve present invention. The backflow prevention assembly contemplated for use is the same one currently in use throughout the United States to prevent contamination from coming back into the potable water main pipes from irrigation, fire sprinkler, and other areas where backflow into existing water mains could cause bacterial contamination of the potable water being used by the general public. The temporary backflow prevention assembly is installed above ground with its two check valves also being positioned above ground, and it is temporarily used to fill new water mains and satisfy other on-site use purposes. The backflow prevention assembly connection to the present invention tri valve is temporary, and when it is removed it can be reused in similar applications at a next phase of new water main installation or repair/upgrade. Subsequent to backflow prevention assembly connection to the present invention and after all new pipe for potable water use is installed in a new development or needed pipe upgrade is complete, before the new or upgraded water main pipe is activated for public use, it is pressure tested and bacteria tested according to government standards. After the new or upgraded water main pipe passes all testing requirements, the two 6-inch side valves of the present invention tri valve are shut off and plugged. The backflow prevention assembly is thereafter removed, and the 12-inch main valve on the present invention tri valve is then opened. Since the new/upgraded pipe was not exposed to any air or potential bacterial contamination as a result of removal of the temporary backflow prevention assembly and during new pipe construction or repair/upgrade, the existing water main was protected from any source of contamination backflow and it can be safely used without further testing. The present invention tri valve can be used and manufactured in many sizes to meet local water demands and the needs of the population served by the new and existing sections of water main pipe.

The description herein provides preferred embodiments of the present invention tri valve but should not be construed as limiting its scope. For example, variations in its size; the materials of the nuts, bolts, o-rings, and gaskets used to install it; and the materials used for its valve adjusting stem and valve wedge gates, other than those shown and described herein, may be incorporated into the present invention. Thus, the scope of the present invention should be determined by the appended claims and their legal equivalents, rather than being limited to the examples given.

DETAILED DESCRIPTION OF PREFERRED EMBODIMENTS

The present invention provides a tri valve 1 that is installed onto an existing potable water main pipe 7 by means of a tapping sleeve, a cut-in tee, an existing stub out, an existing valve, and/or similar means (not shown), at the beginning of construction to install a new section of water main pipe 8, or upgrade/repair an existing section of water main pipe, for future use by residential or commercial developments to satisfy potable water needs. For example, a contractor or utility company would excavate down to an existing 12-inch water main 7 with an existing 12-inch stub out tee, or install a 12-inch tapping saddle to core into an existing 12-inch potable water line 7. Thereafter, a 12-inch by 6-inch present invention tri valve 1 would be installed by whatever means are available to tie it in, as long as the tie in process is conducted in accordance with federal, state, and/or local standards or specifications. When tie in is complete, the 12-inch main valve gate 2 of the tri valve present invention 1 would be shut off. A temporary backflow prevention assembly 19 (shown in FIGS. 4 and 5) with its two check valves 12 would be connected to the two 6-inch side valves 3 of the tri valve present invention 1. The backflow prevention assembly 19 contemplated for use with the present invention is the same one currently in use throughout the United States to prevent contamination from coming back into the potable water main pipes 7 from irrigation, fire sprinkler, and other areas where backflow into existing water mains could cause bacterial contamination of the potable water being used by the general public. The temporary backflow prevention assembly 19 is installed above ground with its two check valves 12 also being positioned above ground, and it is temporarily used to fill new water mains 8 and satisfy other on-site water needs. The backflow prevention assembly 19 connection to the present invention tri valve 1 is temporary, and when it is removed the temporary backflow prevention assembly 19 is available for reuse at the next phase of new water main installation or repair/upgrade, or in other appropriate applications. Subsequent to connection of the temporary backflow prevention assembly 19 to the present invention 1, and after all new pipe 8 for potable water use is installed in a new development or needed pipe repair/upgrade is complete, and also before the new or upgraded water main pipe 8 is activated for public use, the new or upgraded section of water main pipe 8 is pressure tested and bacteria tested according to government standards. After the new or upgraded water main pipe 8 successfully passes all testing requirements, the two 6-inch side valves 3 of the present invention tri valve 1 are shut off and plugged. The temporary backflow assembly 19 is thereafter removed, and the 12-inch valve 2 on the present invention tri valve 1 is then opened. Since the new/upgraded pipe 8 was not exposed to any air or potential bacterial contamination as a result of removal of the temporary backflow prevention assembly 19 and it had previously passed all required pressure and bacteria testing, and also since during new pipe construction or upgrade the existing water main 7 was protected from any source of contamination backflow, the new/repaired/upgraded water main section 8 can be safely used after the main valve body 2 of the present invention tri valve 1 is opened. The present invention tri valve 1 can be used and manufactured in many sizes to meet local water demands and the needs of the population served by the new and existing sections of water main pipe, and the measurements provided herein above are merely examples of appropriate measurements in one specific application. Should the present invention 1 incorporate gate valves 2 and 3 having diameter dimensions between three inches and twenty inches, they would be constructed to meet or exceed the requirements of AWWAC509. Should the present invention incorporate larger valves 2 and 3, such as Butterfly valves having diameter dimensions twenty-four inches or greater, they would be constructed to meet or exceed the requirements of AWWAC504. All valve construction in present invention tri valve 1 shall also conform to standards of the American Society for Testing and Materials (ASTM).

Figure 1:
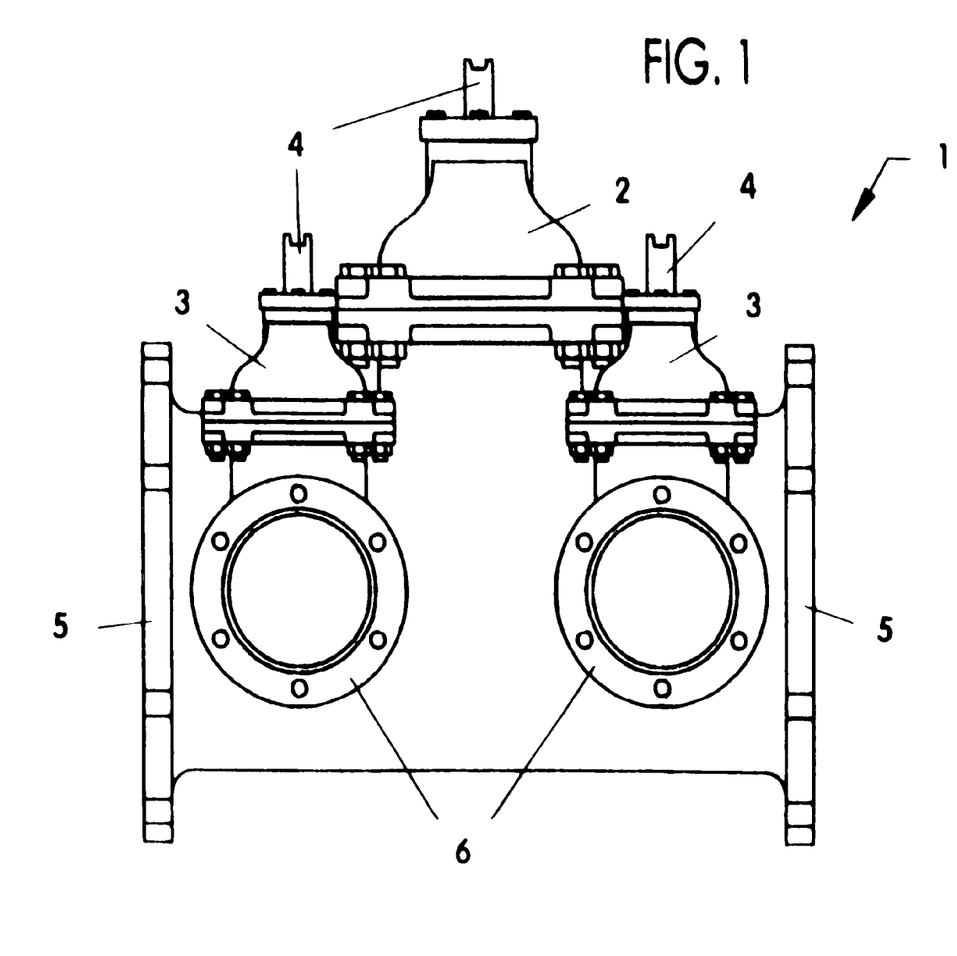
FIG. 1 is a right side view of the most preferred embodiment of the present invention having two side valves positioned for water flow in perpendicular orientation to that of its larger main valve body.
Figure 2:
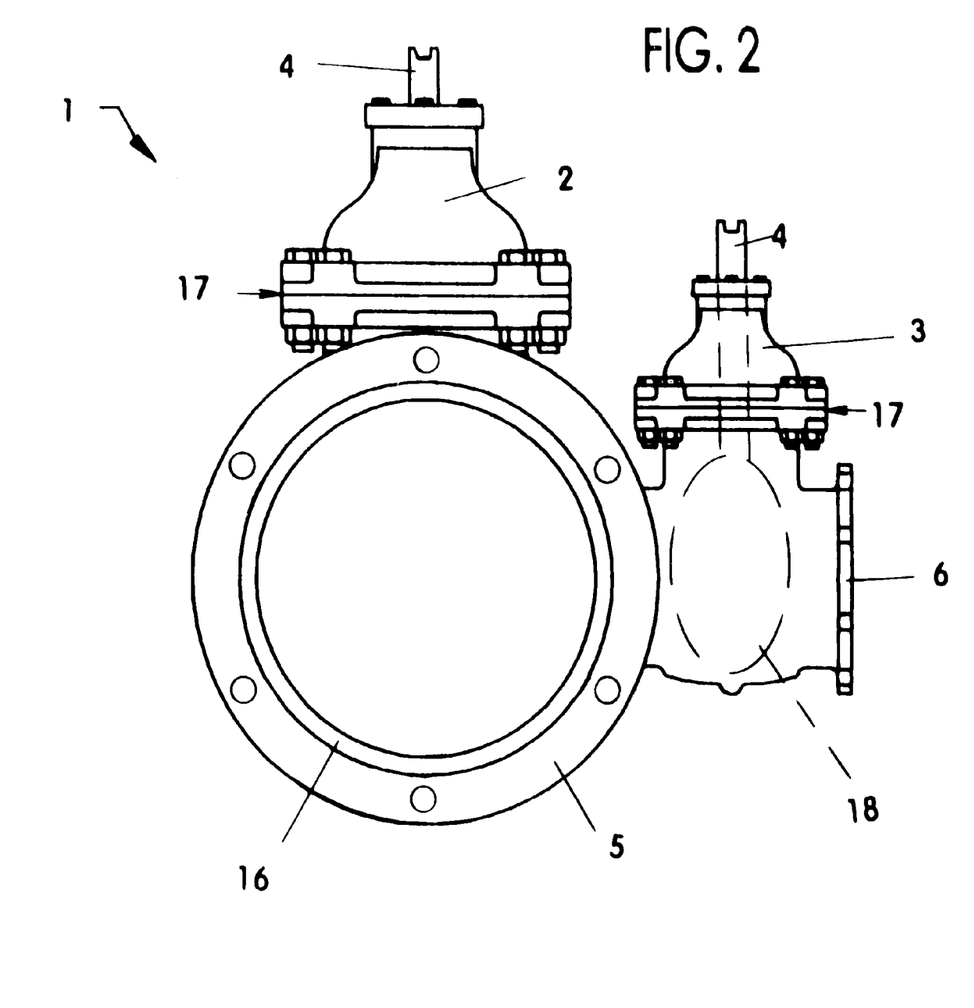
FIG. 2 is a front view of the most preferred embodiment of the present invention having a large main valve body positioned for water flow in perpendicular orientation to that of one visible smaller side valve.
Figure 3:
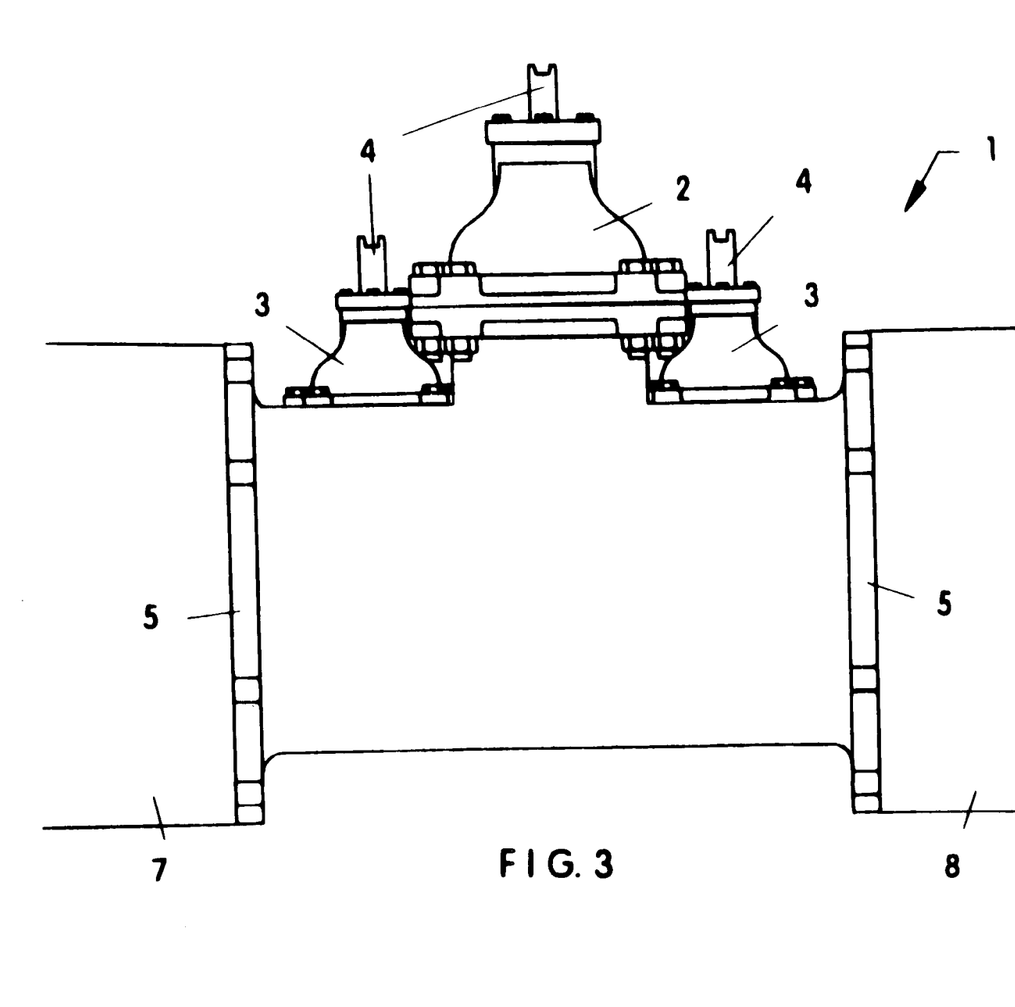
FIG. 3 is a left side view of the main valve body of the most preferred embodiment of the present invention connected between new and existing sections of water main pipe.

FIGS. 1–3 show the most preferred embodiment of the present invention tri valve 1. FIG. 1 shows the present invention tri valve 1 having one main valve body 2 and two side valve bodies 3. For convenience in connecting a temporary backflow prevention assembly 19 (see FIGS. 4 and 5) to side valve bodies 3, the flow of water through the main gate valve connections 5 is in substantially perpendicular orientation to the flow of water through both of the side valve connections 6. Main valve body 2 and side valve bodies 3 are not in fluid communication with one another. FIG. 1 further shows the keyed valve stems 4 on the top of main valve body 2 and side valve bodies 3 that are used to open and close the wedge gates 18 (see FIG. 2 for a schematic representation of a wedge gate 18) respectively within each main valve body 2 and side valve body 3. FIG. 1 shows side valve bodies 3 having a smaller cross-sectional configuration than main valve body 2, and if main valve body 2 is configured for connection to twelve-inch water main pipe, side valve bodies could be configured for connection to six-inch water main pipe to supply on-site construction water needs. FIG. 2 shows the most preferred embodiment of the present invention tri valve 1 with the number 17 showing the preferred position of a rubber gasket, the number 16 showing the preferred position of an o-ring, and the number 18 showing the gate valve that is within each main valve body 2 and side valve body 3 to open and close them. FIG. 2 only shows one side valve body 3, as the second side valve body 3 is behind the one shown and hidden in FIG. 2. FIG. 3 shows main valve body 2 connected between existing water main pipe 7 and a new/upgraded/repaired section of water main pipe 8. As in FIGS. 1 and 2, FIG. 3 also shows both side valve bodies 3 connected on the same side of the present invention tri valve. Although all such components are not shown, the tri valve backflow preventer of the present invention has parts and materials preferably consisting of steel nuts and bolts ductile iron operating nuts, nitrite rubber O-rings, nitrite rubber gaskets, manganese bronze valve adjusting stems, valve wedge gates made of ductile iron encapsulated with EPDM rubber, and ductile iron valve bodies. Also, material and parts are constructed in accordance with ASTM standards and the requirements of the AWWAC-509 and AWWAC-504 for gate valves and butterfly valves.

Figure 4:
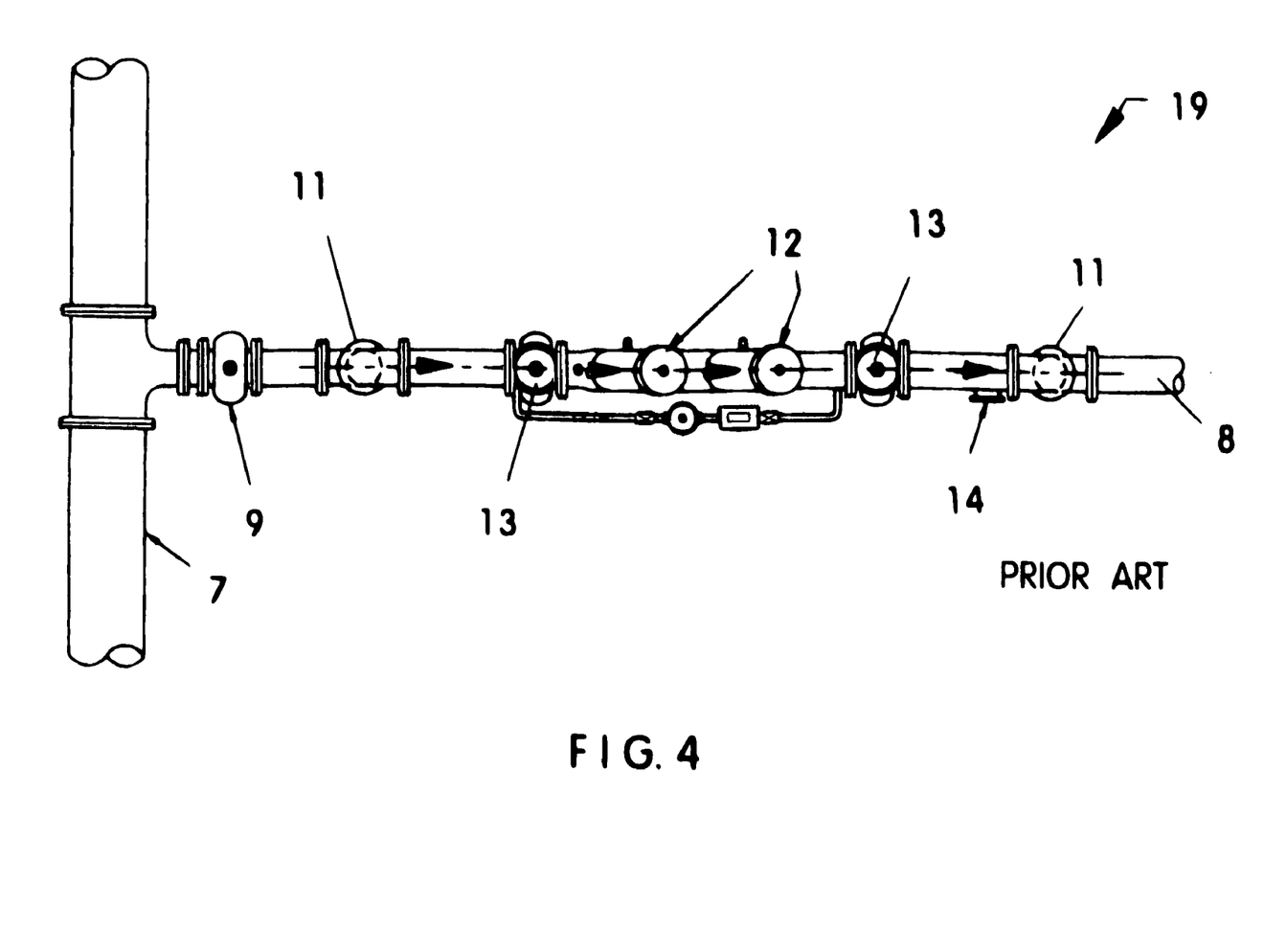
FIG. 4 is a top view of a prior art temporary backflow prevention assembly that could be connected to the most preferred embodiment of the present invention during construction of new and repaired/upgraded water main pipe to protect the existing water main pipe from possible bacterial contamination prior to tie in of the new or repaired/upgraded pipe once its pressure and bacterial testing is successfully completed.
Figure 5:
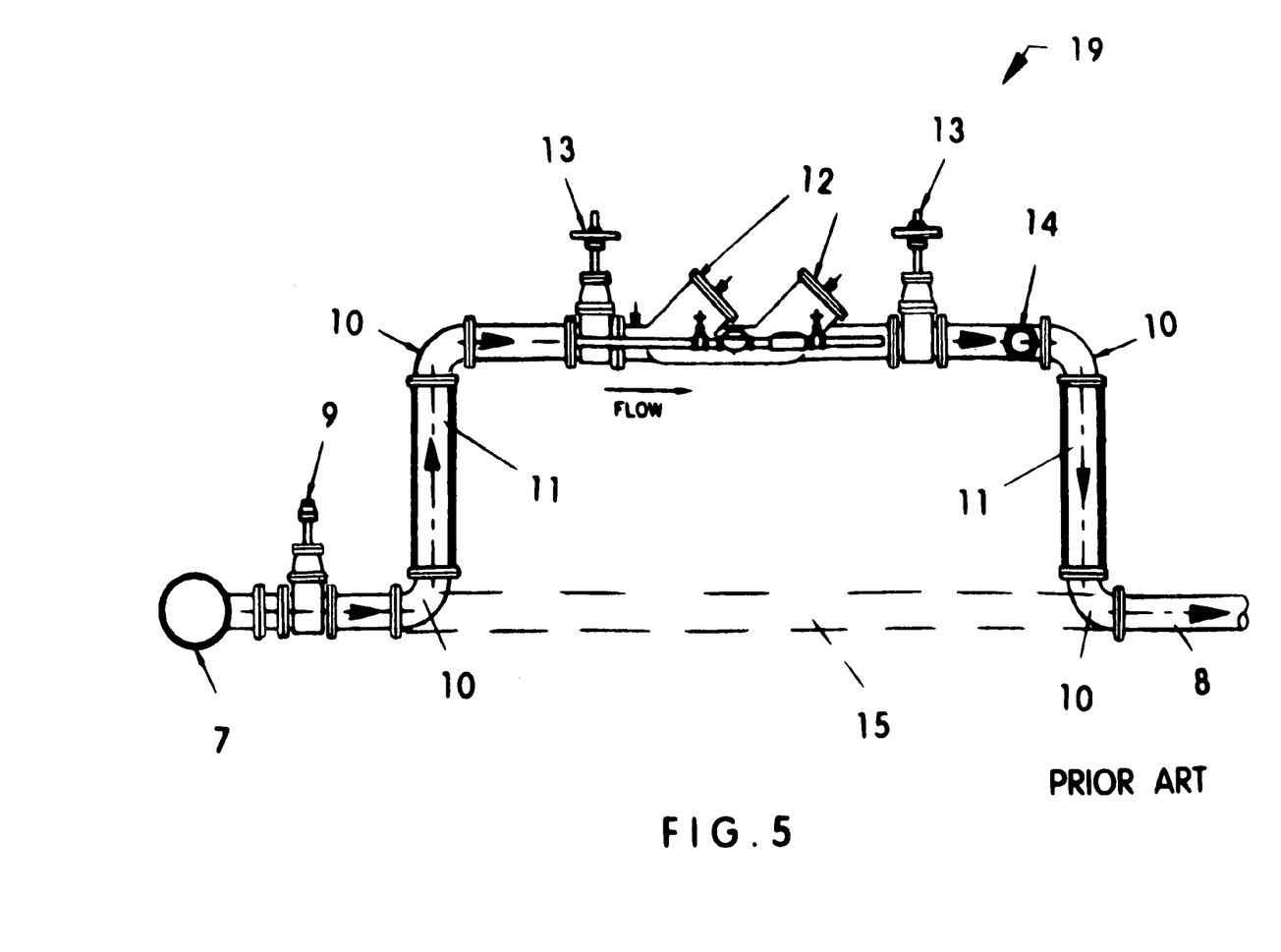
FIG. 5 is a side view of the prior art temporary backflow prevention assembly previously shown in FIG. 4 with its two backflow prevention valves and a fire line connection.
Figure 6:
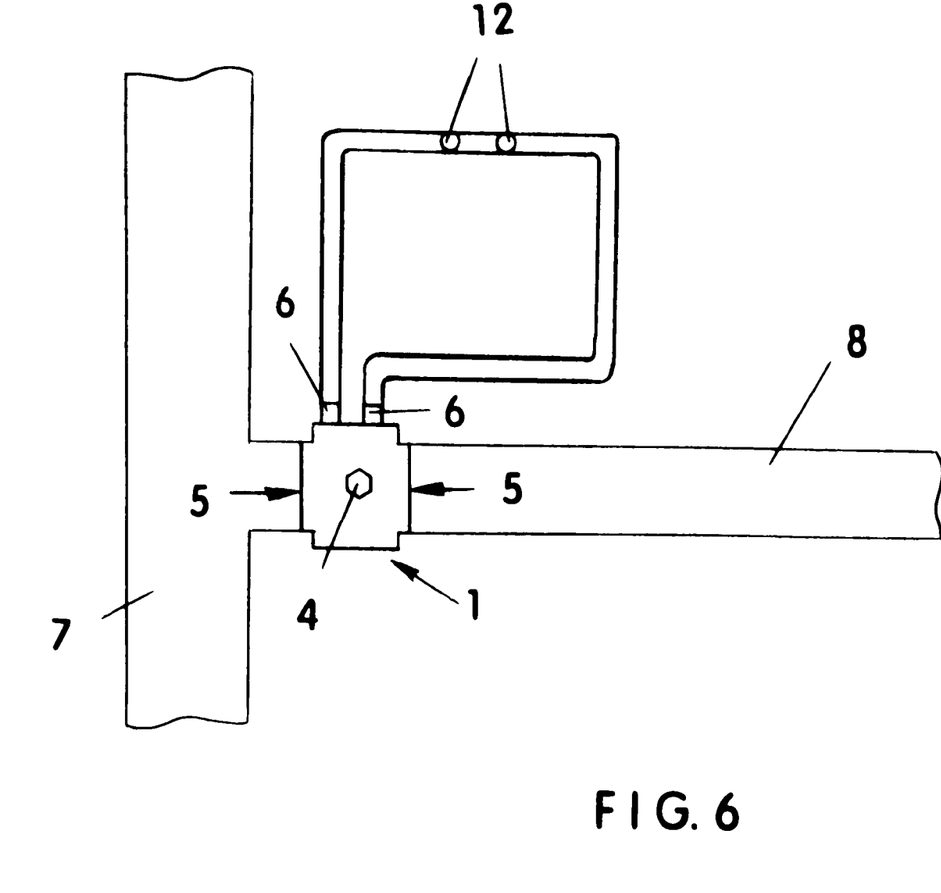
FIG. 6 is a schematic top view of the most preferred embodiment of the present invention connected between new and repaired/upgraded water main pipe.

FIGS. 4 and 5 show a prior art jumper system wherein a temporary backflow prevention assembly 19 having two test valves 13, two check valves 12, a fire line connection 14, two sections of riser pipe 11, and elbow fittings 10, is connected in-line with a gate valve 9 between existing water main pipe 7 and a new/repaired/upgraded section of water main pipe 8. In contrast, FIG. 6 shows how a present invention tri valve 1 would be connected during water main construction. A temporary backflow prevention assembly 19 identical to or similar to that shown in FIGS. 4 and 5 can be connected to the side valve bodies 3 of the present invention tri valve 1 and used with it to supply water needed for on-site or fire fighting purposes during construction involving installation, repair, or upgrade of water main pipe 8. Therefore, as shown in FIG. 4, the order of positioning using known prior art water main construction methods is existing water main pipe 7, gate valve 9, temporary backflow prevention assembly 19, and new/repaired/upgraded water main pipe 8. In contrast and as shown in FIG. 6, the order of positioning using the present invention tri valve is existing water main pipe 7, tri valve 1, and new/repaired/upgraded water main pipe 8, with the temporary backflow prevention assembly 19 connected only to the two side valve bodies 3 of tri valve 1, and no direct connection existing between the temporary backflow prevention assembly 19 and the new/repaired/upgraded water main pipe 8. As a result, after the new/repaired/upgraded water main pipe 8 successfully passes pressure and bacterial testing, the tri valve 1 remains in its original location, and its connection to the existing water main pipe 7 and new/repaired/upgraded water main pipe 8 is not breached during the activation of the new/repaired/upgraded water main pipe 8 for its delivery of safe drinking water to the public. Instead, activation of the new/repaired/upgraded water main pipe 8 using the tri valve 1 simply requires shutting off the two side valve bodies 3 using their keyed valve stems 4, plugging the two side valve connections 6 to avoid leakage, removing the temporary backflow prevention assembly 19 without loss of water from the new/repaired/upgraded water main pipe 8, and using the keyed valve stem 4 on the main valve body 2 to open it and cause good clean drinking water to flow from the existing water main pipe 7 into the new/repaired/upgraded water main pipe 8. Since water is drained from the new/repaired/upgraded water main pipe 8, large amounts of good drinking water are not wasted on flushing/refilling steps after it successfully passes the required initial pressure and bacterial testing. FIG. 5 shows in broken lines the position of a sleeve 15 that is needed to span the approximate eight foot gap that will occur during prior art methods of water main construction between the existing water main pipe 7 and a new/repaired/upgraded section of water main pipe 8 once construction is finished and the temporary backflow prevention assembly 19 is removed. It is during this step of removing the temporary backflow prevention assembly 19, and the process of replacing it with an additional section of water main pipe (not shown), that causes water to be drained from the successfully tested new/repaired/upgraded section of water main pipe 8 and exposes it to possible bacterial contamination, flushing with copious amounts of good drinking water, and retesting to meet pressure and bacteria requirements. Since the present invention tri valve 1 is never removed once it is installed between existing water main pipe 7 and new/repaired/upgraded sections of water main pipe 8, overall inspection and testing time of the new/added sections of water main pipe 8 are reduced compared to prior art methods, with only one testing event being required prior to removal of the temporarily installed conventional backflow prevention assembly 19 and no testing events being needed after its removal. Reduced labor translates into reduced job cost, however, use of the present invention tri valve 1 also reduces material cost as use of a connection sleeve 15 between existing 7 and new 8 sections of water main pipe is no longer required after temporarily installed conventional backflow prevention assembly 19 removal.

The invention claimed is:

1. A tri valve backflow prevention apparatus for use with a temporary conventional backflow prevention assembly between existing water main pipe and water main pipe under construction, and which permits activation of the water main pipe under construction and removal of the conventional temporary backflow prevention assembly without water in the water main pipe under construction being drained after its required pressure and bacterial testing is successfully completed, and also without the wasteful practice of additional water being needed to flush and refill the emptied water main pipe under construction, and without exposure of the emptied water main pipe under construction to contamination on the construction site and the need for flushing the emptied water main pipe with good drinking water to remove such potential contamination, said tri valve backflow prevention apparatus comprising:

a tri valve housing with a main valve body and two side valves, said main valve body configured for connection between existing water main pipe and water main pipe under construction, and both of said side valves configured for connection to a temporary backflow prevention assembly; and easily accessible means for opening and closing said main valve and each of said side valves so that during water main construction said main valve body remains closed and said two side valves are allowed to remain open to provide water needed at the construction site via said temporary backflow prevention assembly, and when all construction and testing is completed, said easily accessible opening and closing means are used to close said two side valves and thereafter open said main valve for immediate activation of water main pipe for drinking water delivery to the public and removal of the temporary backflow prevention assembly without causing any water to be drained from the water main pipe under construction.

2. The apparatus of claim 1 wherein said main valve body and said side valves each have valve bodies made from ductile iron encapsulated with EPDM rubber.

3. The apparatus of claim 1 wherein said easily accessible means for opening and closing said main valve and each of said side valves comprises a top seated operating nut and wherein each of said valve bodies further comprises a plurality of nuts and bolts, at least one O-rings, at least one rubber gasket, a valve adjusting stem, and a valve wedge gate.

4. The apparatus of claim 3 wherein said nuts and bolts are made from steel.

5. The apparatus of claim 3 wherein said operating nuts are made from ductile iron.

6. The apparatus of claim 3 wherein said O-rings are made of nitrile rubber.

7. The apparatus of claim 3 wherein said rubber gaskets are made of nitrile rubber.

8. The apparatus of claim 3 wherein said valve adjusting stems are made of manganese bronze.

9. The apparatus of claim 3 wherein said valve wedge gates are made of ductile iron encapsulated with EPDM rubber.

10. The apparatus of claim 3 wherein said nuts and bolts are made from steel, said operating nuts are made from ductile iron, said O-rings are made from nitrile rubber, said rubber gaskets are made from nitrile rubber, said valve adjusting stems are made from manganese bronze, and said valve wedge gates are made of ductile iron encapsulated with EPDM rubber.

11. A method of protecting existing water main pipe and public drinking water during water main construction that allows for connection of water main pipe under construction to existing water main pipe and immediate delivery of good drinking water to the public after construction is complete subsequent to the successful completion of applicable pressure and bacterial testing of the water main pipe under construction without it being drained of water and exposed to possible bacterial contamination during the removal of a temporary backflow prevention assembly used with it during the construction process, said method comprising the steps of:

provide a tri valve backflow prevention apparatus with a main valve body and two side valves, said main valve body configured for connection between existing water main pipe and water main pipe under construction, and both of said side valves configured for connection to a temporary backflow prevention assembly, easily accessible means for opening and closing said main valve and each of said side valves, a temporary backflow preventer assembly, existing water main pipe, water main pipe under construction, and pressure and bacterial testing equipment;

connecting said main valve of tri valve backflow prevention apparatus between said existing water main pipe and said water main pipe under construction;

connecting said temporary backflow prevention assembly to said side valves of said apparatus;

using said opening and closing means to open said side valves and close said main valve body during water main construction;

after said water main construction is complete, using said pressure and bacterial testing equipment to test said water main pipe under construction;

after said pressure and bacterial testing are successfully completed according to applicable standards, using said opening and closing means to close said side valves;

using said opening and closing means to open said main valve body to activate said water main pipe under construction for drinking water delivery to the public; and removing said temporary backflow prevention assembly without causing any water to be emptied from said water main pipe under construction, and also without the wasteful practice of additional water being needed to flush and refill said water main pipe under construction after being emptied, and without exposure of the emptied water main pipe under construction to contamination on the construction site and the need for flushing said emptied water main pipe with good drinking water to remove such potential contamination.

12. The method of claim 11 wherein the order of accomplishing said steps of using said opening and closing means to open said main valve body to activate said water main pipe under construction and removing said temporary backflow prevention assembly is reversible.

13. The method of claim 11 wherein said main valve body and said side valves each have valve bodies made from ductile iron encapsulated with EPDM rubber.

14. The method of claim 11 wherein said backflow preventer comprises a plurality of nuts and bolts, an operating nut, a plurality of O-rings, a plurality of rubber gaskets, a valve adjusting stem, and a plurality of valve wedge gates.

15. The method of claim 14 wherein said nuts and bolts are made from steel.

16. The method of claim 14 wherein said operating nuts are made from ductile iron.

17. The method of claim 14 wherein said O-rings and rubber gaskets are made of nitrile rubber.

18. The method of claim 14 wherein said valve adjusting stems are made of manganese bronze.

19. The method of claim 14 wherein said valve wedge gates are made of ductile iron encapsulated with EPDM rubber.

20. The method of claim 11 further comprising a step of providing plugging means adapted to seal said side valves, and a step of using said plugging means to plug said side valves after said step of removing said temporary backflow prevention assembly.

* * * * *